Patented Feb. 8, 1938

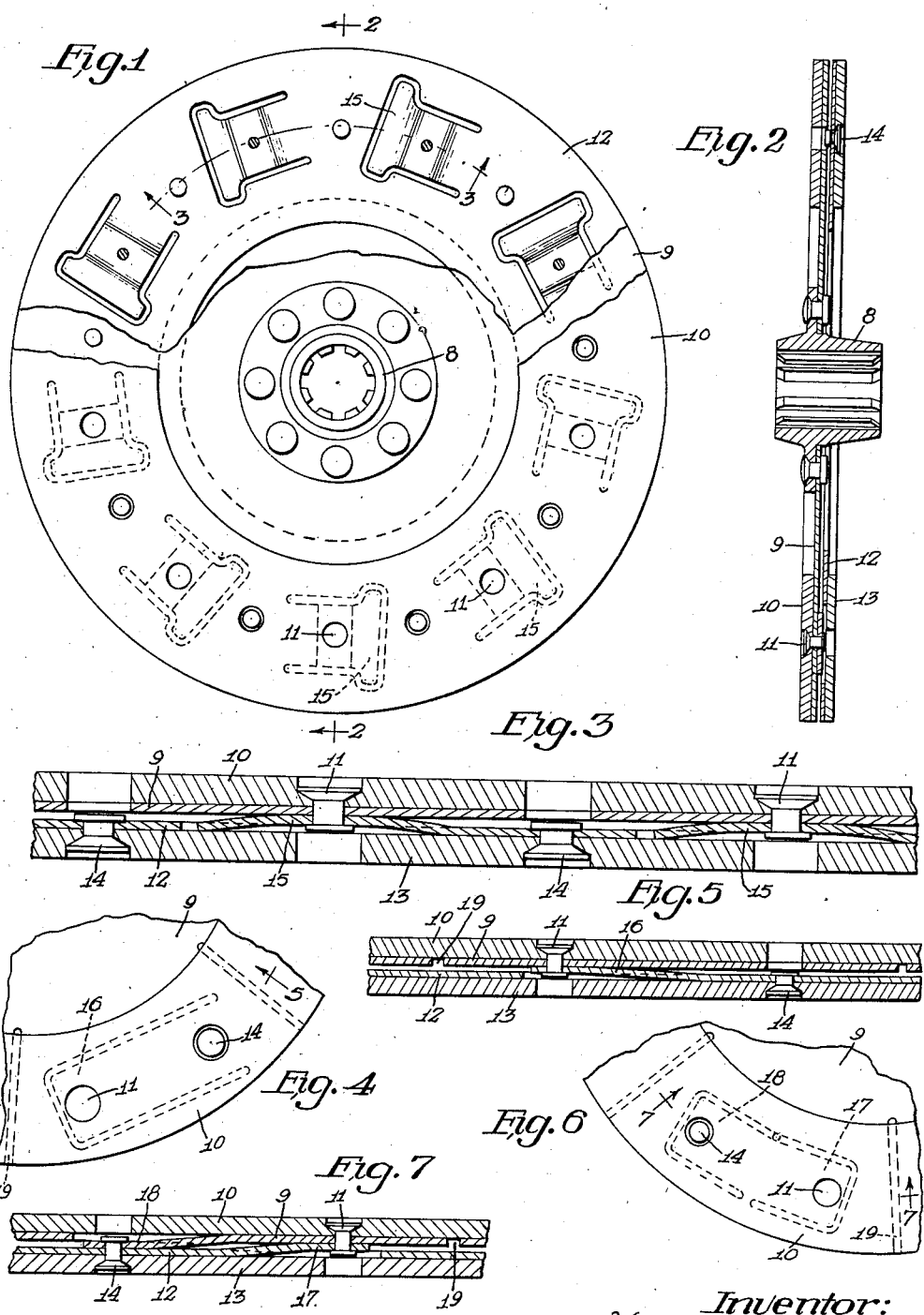

2,107,741

UNITED STATES PATENT OFFICE 2,107,741

CLUTCH PLATE

Harold V. Reed, Chicago, Ill., assignor, by mesne assignments, to Borg-Warner Corporation, Chicago, Ill., a corporation of Illinois Application October 31, 1934, Serial No. 750,836

10 Claims. (Cl. 192—107)

This invention relates to friction clutches for automotive vehicles and it may also be used in other friction clutches for which it is or may be adapted.

Clutch plates have heretofore been made in various forms but they usually comprise a metal disc made fast to the driven member, and friction facing secured to the disc on opposite sides thereof adjacent the periphery of the disc and adapted to be located between the clamping parts of the driving member. Parts of the disc have been struck from the plane of the disc between the facings to one or both sides of the disc to form tongues which are spaced apart circumferentially of the disc and provide a cushion support for the facing. The facing has been spaced from the body of the disc by the tongues and because the tongues are spaced apart the facing has no direct support between the tongues. The unsupported parts of the facing have not made as complete contact with the driving member as the parts of the facing supported by the tongues inasmuch as the facing has been free to give slightly between the tongues. The result has been that the facings wear to a greater extent at the portions where they are directly supported by the tongues than at the portions between the tongues where they are not directly supported thereby producing an un-uniform initial engagement.

The primary object of this invention is to support a cushioned facing of a clutch plate substantially throughout its area so that the facing will make full contact with the driving member of a clutch upon initial engagement.

Another object is to provide each facing of a clutch plate with a substantially solid backing and with a cushion interposed between the backings to cushion the engagement of the facings.

And a further object is to provide a novel clutch plate having friction facings mounted for axial cushioning movement relative to each other and wherein each facing has an individual backing therefor for solidly supporting the facings substantially throughout their areas to provide a substantially full contact for the facings with the driving member upon initial engagement of the clutch.

In the accompanying drawing I have illustrated a selected embodiment of the invention and referring thereto:

Fig. 1 is a side elevation of the clutch plate showing one of the friction facings and the disc partly broken away;

Fig. 2 is a sectional view on the line 2—2 of Fig. 1;

Fig. 3 is an enlarged sectional view on the line 3—3 of Fig. 1;

Fig. 4 is a fragmentary side elevation of a modified form of the invention;

Fig. 5 is an enlarged sectional view on the line 5—5 of Fig. 4;

Fig. 6 is a fragmentary side elevation of another modified form of the invention; and Fig. 7 is an enlarged sectional view on the line 7—7 of Fig. 6.

Referring to the drawing the clutch plate comprises a hub member 8 to which a disc 9 is securely fastened. A friction facing 10 is secured to one side of the disc at the peripheral portion thereof by rivets 11. A friction facing 13 is secured by rivets 14 to an annulus 12. The annulus is suitably slotted to form tongues 15 which are struck from the plane of the annulus to the opposite side thereof from the facing 13. In the form of the invention disclosed in Figs. 1 to 3 the end portions of the tongues 15 are bent back to dispose the ends of the tongues in the plane of the annulus leaving the central portion thereof disposed to one side of the plane of the annulus. The rivets 11 securing the facing 10 to the disc extend through the central portion of the tongues 15 to also secure the tongues 15 and annulus 12 to the disc. The tongues form a cushion for the engagement of the facings in the friction clutch and the annulus 12 backs up the facing 13 so that it is supported substantially throughout its area to avoid any give of the facing at the time of engagement of the clutch and provides a full contact of the facing with the driving member.

In another form of the clutch plate shown in Figs. 4 and 5 the tongues have been formed to provide a more resilient cushion than is provided by the tongues shown in the form disclosed in Figs. 1 to 3. The disc shown in Figs. 4 and 5 is slotted to form elongated tongues 16 which are struck from the plane of the annulus to the opposite side thereof from the facing 13. The rivets 11 securing the facing 10 to the disc extend through the end portion of the tongues 16 to secure the tongues 16 and annulus 12 to the disc. The tongues 16 are more resilient than the tongues 15 because the lever arm of the tongues is considerably longer and because the rivets 11 secure the end portions of the tongues to the disc instead of the central portion.

Figs. 6 and 7 show another form wherein tongues are struck both from the annulus and from the disc to form pairs of tongues. The annulus is slotted to form tongues 17 which are struck from the disc to dispose the end portions on the opposite side of the plane of the annulus from the facing 13. The rivets 11 extend through the end portions of the tongues 17 to hold the tongues 17, facing 10 and disc 9 together. Tongues 18 are struck from the disc to dispose their end portions to the opposite side of the plane of the disc from the facing 10 and the rivets 14 extend through the end portions of the tongues 18 to hold the tongues 18, facing 13 and annulus 12 together.

The disc 9 may, if desired, be provided with narrow radial slots 19 to form sectors in the peripheral portion of the disc. The radial slots are located between each tongue, or between the pairs of tongues in the form shown in Figs. 6 and 7. The radial slots will provide a greater flexibility to the clutch plate and may or may not be used as desired. These slots are so narrow and the span of the facing over them is so short that they do not lessen the support of the facing; and it will be understood that when I refer to the facing lacking support I do not mean at such slots but I do mean at the spaces intermediate of the tongues to which the facing is fastened or by which the facing is supported and whether those tongues are formed in sectors or in an unslotted disc. In Figs. 1 to 3 the disc is unslotted, the facing 10 is flatly supported thereon, and the annulus is unslotted radially but is provided with tongues which form the cushion between the plate and the annulus and the facing 13 is flatly supported on the annulus. In Figs. 4 and 5 the disc is slotted to form the sectors but the facing 10 is supported flatly on the sectors as it is supported on the unslotted disc of Fig. 3. In Figs. 6 and 7 the disc is provided with sectors and the sectors are provided with tongues, and the annulus also has tongues, and the facings fit flatly against the disc and the annulus and are unsupported only at small areas within the inner and outer edges of the facings. These small areas are unimportant insofar as supporting the facing is concerned because the facing is supported at the inner side and at the outer side of said areas within the inner and outer edges of the facing. My invention avoids the unsupported sections of the facing of large and substantial area which have resulted from mounting the facing upon tongues spaced apart and supporting the facing spaced from the member from which the tongues are struck.

The invention affords a clutch plate having friction facings thereon adapted to be gripped by the driving member of the clutch for transmission of the motion of the driving member to the driven member wherein the initial engagement of the facings is cushioned and the facings are backed up substantially throughout their area to provide full and complete contact of the facings with the driving member. The friction facings are supported so that they will not give between the fastening means and therefore the facings will wear evenly throughout their area.

While I have shown and described the invention in a particular type of clutch plate I do not mean thereby to restrict the invention to this embodiment for it can be employed in many different kinds of clutches and clutch plates with satisfactory results; and therefore I reserve the right to use the invention in any form and for any purpose for which it is or may be adapted within the scope of the following claims:

I claim:

1. A clutch plate comprising, a disc, an annulus having yieldable portions extending away from the body of said annulus in the direction of said disc, a pair of friction facings, common means securing one of said facings, the yieldable portions of said annulus and said disc together, and means securing the other of said facings and said annulus together.

2. A clutch plate comprising, a disc member, an annulus member, a pair of friction facings, cushion means on one of said members, means securing one of said facings and said one member together and means securing the cushion means, the other of said facings and the other of said members together.

3. A clutch plate comprising, a hub member, a disc member connected to said hub member, a facing on the outer side of said disc member, an annulus member on the other side of the disc member opposite the facing and independent of the hub member and carried by said disc member, another facing on the outer side of the annulus member, and cushion means for the facings integral with one of the members and interposed between said members and connected to one of said facings.

4. A clutch plate comprising, a disc, an annulus, a pair of friction facings, tongues on said annulus struck from one side out of the plane thereof to form a cushion, the annulus arranged adjacent the peripheral portion of the disc on one side thereof with the tongues engaging the disc, one of the facings arranged on the opposite side of the annulus and the other facing arranged on the opposite side of the disc, means securing said tongues, said disc and the facing arranged on said opposite side of the disc together, and means securing said annulus and the facing arranged on said opposite side of the annulus together.

5. A clutch plate comprising, a disc, an annulus, a pair of friction facings, tongues on said annulus struck from one side out of the plane thereof to form a cushion, the end portion of the tongues bent back to dispose the ends thereof in the plane of the disc, the annulus arranged adjacent the peripheral portion of the disc on one side thereof with the central portion of the tongues engaging the disc, one of the facings arranged on the opposite side of the annulus and the other facing arranged on the opposite side of the disc, means securing the central portion of the tongues, said disc and the facing arranged on said opposite side of the disc together and means securing said annulus and the facing arranged on said opposite side of the annulus together.

6. A clutch plate comprising, a disc, an annulus, a pair of friction facings, tongues on said annulus struck from one side out of the plane thereof to form a cushion, the annulus arranged adjacent the peripheral portion of the disc on one side thereof with the end portions of the tongues engaging the disc, one of the facings arranged on the opposite side of the annulus and the other facing arranged on the opposite side of the disc, means securing the end portions of said tongues, said disc and the facing arranged on said opposite side of the disc together, and means securing said annulus and the facing arranged on said opposite side of the annulus together.

7. A clutch plate comprising, a disc, and an annulus member arranged adjacent thereto, a friction facing on the outer side of each of said members, cushion means on said members, means securing one of said members, the facing on the outside thereof and the cushion means on the other of said members together, and means securing the other of said members, the facing on the outside thereof and the cushion means on said one member together.

8. A clutch plate comprising, a disc, and an annulus member, a pair of friction facings, cushion means on said members struck from one side thereof, said members arranged with the sides having the cushion means thereon adjacent each other and said facings arranged on the other sides of said members respectively, means securing said annulus member, the facing on said other side thereof and the cushion means on the disc member together, and means securing said disc member, the facing on said other side thereof and the cushion means on said annulus member together.

9. A clutch disc comprising, a hub, a circular plate member fixed to said hub, an annular cushion member having yieldable portions located entirely within an annular area adjacent the periphery of the circular plate, said cushion member being unattached to said hub, a pair of annular friction facings, one of said facings being located upon one side of said circular plate and the other of said facings being located upon the remote side of said cushion member, common means securing one of said facings and said plate and the yieldable portions of said cushion member together, said means being located within the said annular area, and means directly securing the other of said facings and said cushion together.

10. A clutch plate comprising, a hub, a disc member fixed to said hub, an annulus member free of attachment to said hub, one of said members having a yieldable portion extending away from the body of the said one member in the direction of the other member, a pair of friction facings, common means securing one of said facings and the yieldable portion of said one member and said other member together, and means securing the other of said facing and one of said members together.

HAROLD V. REED.

CERTIFICATE OF CORRECTION.

Patent No. 2,107,741.   February 8, 1938.

HAROLD V. REED.

It is hereby certified that error appears in the printed specification of the above numbered patent requiring correction as follows: Page 2, second column, line 71, and page 3, first column, line 6, claims 7 and 8 respectively, for "disc, and an" read disc member, an; and that the said Letters Patent should be read with these corrections therein that the same may conform to the record of the case in the Patent Office.

Signed and sealed this 15th day of March, A. D. 1938.

Henry Van Arsdale, (Seal)   Acting Commissioner of Patents.